(12) United States Patent
Jeong et al.

(10) Patent No.: US 6,509,670 B2
(45) Date of Patent: Jan. 21, 2003

(54) SINGLE STAGE MICROACTUATOR FOR MULTIDIMENSIONAL ACTUATION WITH MULTI-FOLDED SPRING

(75) Inventors: Hee-moon Jeong, Kyungki-do (KR); Jong Up Jeon, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 10 days.

(21) Appl. No.: 09/904,510

(22) Filed: Jul. 16, 2001

(65) Prior Publication Data

US 2002/0047493 A1 Apr. 25, 2002

(30) Foreign Application Priority Data

Jul. 19, 2000 (KR) .............................. 00-41425

(51) Int. Cl.[7] .......................... H02N 1/00; G02B 21/26
(52) U.S. Cl. .................. 310/309; 73/504.12; 359/224; 359/877
(58) Field of Search .................. 310/309; 73/504.12, 73/504.04; 359/223, 224, 298, 877

(56) References Cited

U.S. PATENT DOCUMENTS

| | | | |
|---|---|---|---|
| 5,536,988 A | | 7/1996 | Zhang et al. |
| 5,963,367 A | * | 10/1999 | Aksyuk et al. ............. 310/309 |
| 5,969,848 A | * | 10/1999 | Lee et al. .................... 250/310 |
| 6,073,484 A | * | 6/2000 | Miller et al. .................... 73/105 |
| 6,230,563 B1 | * | 5/2001 | Clark et al. ............... 73/504.04 |
| 6,445,107 B1 | * | 9/2002 | Jeong et al. ................. 310/309 |
| 6,445,514 B1 | * | 9/2002 | Ohnstein et al. ............ 359/813 |

FOREIGN PATENT DOCUMENTS

| | | | | |
|---|---|---|---|---|
| JP | 5-116757 | * | 5/1993 | ............ H02N/1/00 |
| JP | 11-126110 | * | 5/1999 | ............ H02N/2/00 |

OTHER PUBLICATIONS

Characteristic Modes of Electrostatic Comb–Drive XY Microactuators, Harness et al., May 1999.*
MEMS Based Integrated Circuit Mass Storage Systems, Carley et al., Nov. 2000.*
P.F. Intermuehle et al., "Design and Fabrication of an Overhanging xy–miroactuator with Integrated Tip for Scanning Surface Profiling", Sensors and Actuators A. 43 (1994) 346–350.

* cited by examiner

*Primary Examiner*—Karl Tamai
(74) *Attorney, Agent, or Firm*—Burns Doane Swecker & Mathis, LLP

(57) ABSTRACT

A single stage microactuator for multidimensional actuation is provided. The single stage microactuator includes a substrate, a fixed plate electrode, a rectangular stage, a plurality of drive frame parts each having a plurality of drive frames, first spring parts each having a plurality of spring members and a plurality of spring holding members, a plurality of fixed frame parts, drive comb electrodes, fixed comb electrodes, and second spring parts. The microactuator enables multidirectional actuation with only one electrode and can be manufactured by a simple process without a need for an insulation process and coupling of motions in different directions does not occur due to multi-folded spring structure.

20 Claims, 9 Drawing Sheets

SINGLE STAGE MICROACTUATOR FOR MULTIDIMENSIONAL ACTUATION WITH MULTI-FOLDED SPRING

BACKGROUND OF THE INVENTION

1. Field of the Invention

The present invention relates to a single stage microactuator for multidimensional actuation with multi-folded springs, and more particularly, to an x-y stage microactuator for a scanning probe microscope (SPM) technique based data storage system.

2. Description of the Related Art

A scanning probe microscope (SPM) technique based data storage system includes a data storage medium, an actuator for moving the data storage medium seated on a stage in x- and y-directions, at least one probe having a tip for writing information in or reading information from the data storage medium, and a signal processor for processing an information signal.

Multiple probes can write or read one or more information signals at the same time. For information signal writing or reading, a tip of each probe should be positioned close to a medium. Thus, each of the multiple probes needs an actuator and sensor. The actuator serves to move the probe such that the tip is close to the medium. The sensor reads information from the medium by sensing actuation of the probe according to the information.

For biaxial or multidimensional actuation, for example, in x- and y-directions, at least three electrodes are required for an actuator for single-axial single-directional actuation and at least five electrodes are required for signal-axial bidirectional actuation. According to U.S. Pat. No. 5,536,988, an actuator having multiple electrodes for multidimensional motion is formed in a single silicon structure by insulation utilizing thermal oxidation of selected regions of the device. This method can resolve electrode related problems occurring in multidimensional actuation, but needs complicated processes.

Meanwhile, in an article presented by P.F. Intermuehle et al., "Design and Fabrication of an Overhanging xy-miroactuator with Integrated Tip for Scanning Surface Profiling", Sensors and Actuators A. 43 (1994) 346–350, the use of one electrode for biaxial motion is disclosed. This method is simple because there is no need for an insulation process, but a coupling problem occurs in biaxial actuating because of the structure of an actuator using one electrode.

Furthermore, this structure cannot be directly applied to a large stage for storage devices due to structural instability (easy rotational motion around the vertical axis to an actuating plane) and usable region inefficiency of the stage with respect to the dimension of the microactuctor (space lost by the length of spring between the stage and actuator).

SUMMARY OF THE INVENTION

To solve the above-described problems, it is a first object of the present invention to provide a single stage microactuator for multidimensional actuation with multi-folded springs, which utilizes one electrode for multidimensional motion, and thus the manufacturing process is simplified without a need for an insulation process.

It is a second object of the present invention to provide a single stage microactuator for multidimensional actuation with multi-folded springs, in which coupling of motions in the x- and y-directions can be effectively suppressed.

It is a third object of the present invention to provide a single stage microactuator for multidimensional actuation with multi-folded springs, in which any motion excluding motion in the x- and y-directions is effectively suppressed.

It is a fourth object of the present invention to provide a multidimensional single stage microactuator with multi-folded springs, in which a stage can be enlarged by an effective arrangement structure and thus the microactuator can be applied to actuate a large, high-density storage device.

To achieve the first object of the present invention, there is provided a single stage microactuator for multidimensional actuation, comprising: a substrate; a fixed plate electrode formed at the center of the substrate; a rectangular stage having first and second sides which are perpendicular to each other, the rectangular stage being located above the fixed plate electrode; a plurality of drive frame parts arranged close to each of the first and second sides of the stage, each of the drive frame parts having a plurality of drive frames parallel to one another and perpendicular to the sides of the rectangular stage; first spring parts each for connecting the first and second sides of the stages and the drive frame parts, each of the first spring parts having a plurality of spring members extending parallel to the first and second sides of the stage and a plurality of spring holding members for holding the spring members; a plurality of fixed frame parts arranged on each of the first and second sides of the stage, each of the fixed frame parts having a plurality of parallel fixed frames alternately arranged with the drive frames of the drive frame parts; drive comb electrodes extending parallel to one another and parallel to the first or second sides of the stage, from the drive frames of each of the drive frame parts; fixed comb electrodes extending parallel to one another from the fixed frames of each of the fixed frame parts and being interdigitated with the drive comb electrodes; and second spring parts each for supporting the drive frame parts with respect to the substrate and urging the drive frame parts in the direction of the drive comb electrodes by its elastic bias, each of the second spring parts having a plurality of spring members extending parallel to the drive frames of the drive frame parts and a plurality of spring holding members for holding the spring members.

It is preferable that the drive frames of each of the drive frame parts are connected by auxiliary drive frames at right angles to form a rectangular lattice structure. The fixed frames of each of the fixed frame parts may be fixed to the substrate and may bee separately and electrically connected for each of the fixed frame parts.

It is preferable that each of the fixed frames of the fixed frame parts is located in one unit frame region formed by the drive frames and auxiliary drive frames, and the fixed frames are separately and electrically connected for each of the fixed frame parts.

It is preferable that ends of the spring members of the first and second spring parts are formed by spring connecting elements, and each of the spring holding members is located between neighboring spring members to connect the same and has a length shorter than the spring members, and one side of the second spring parts is connected to a spring support fixed to the substrate.

It is preferable that each of the spring holding members of the first and second spring parts comprises a plurality of connecting plates arranged in a zigzag pattern at a predetermined angle with respect to the spring members to connect neighboring spring members.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
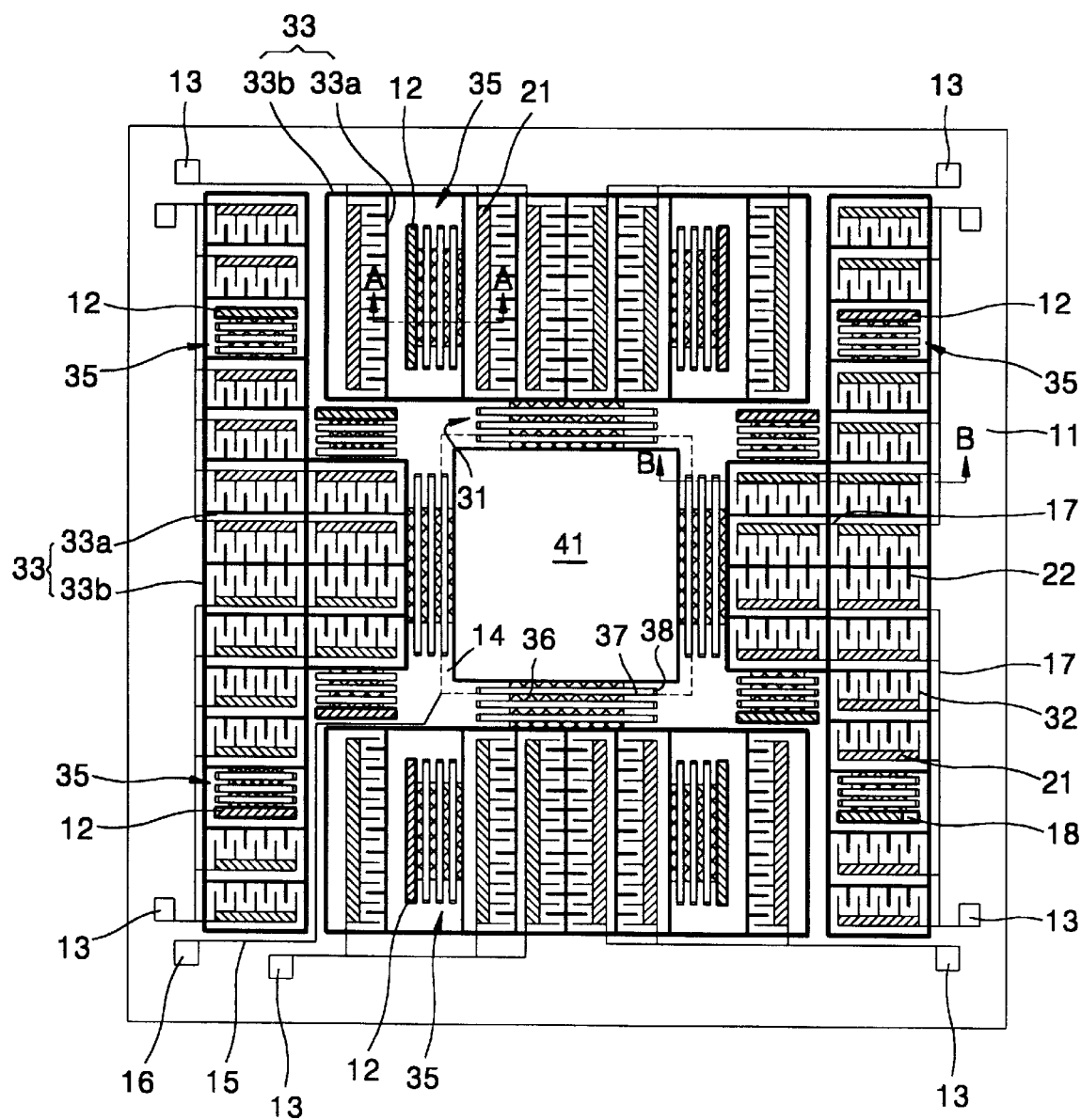
FIG. 1 is a plan view of a preferred embodiment of a single stage microactuator for multidimensional actuation with multi-folded springs according to the present invention.

Referring to FIG. 1, in a preferred embodiment of a multidimensional single-stage microactuator according to the present invention, a stage 41, which is rectangular, having first and second sides at right angles to each other, on which a medium is to be mounted, is located at the center of a rectangular substrate 11.

A plurality of drive frame parts 33 are arranged in each side region around the stage 41. The drive frame part 33, formed as a rectangular lattice, includes a plurality of drive frames 33a extending parallel to one another in a direction perpendicular to each of the first and second sides of the stage 41 and a plurality of auxiliary drive frames 33b connecting the drive frames 33a of each side region.

Figure 2:
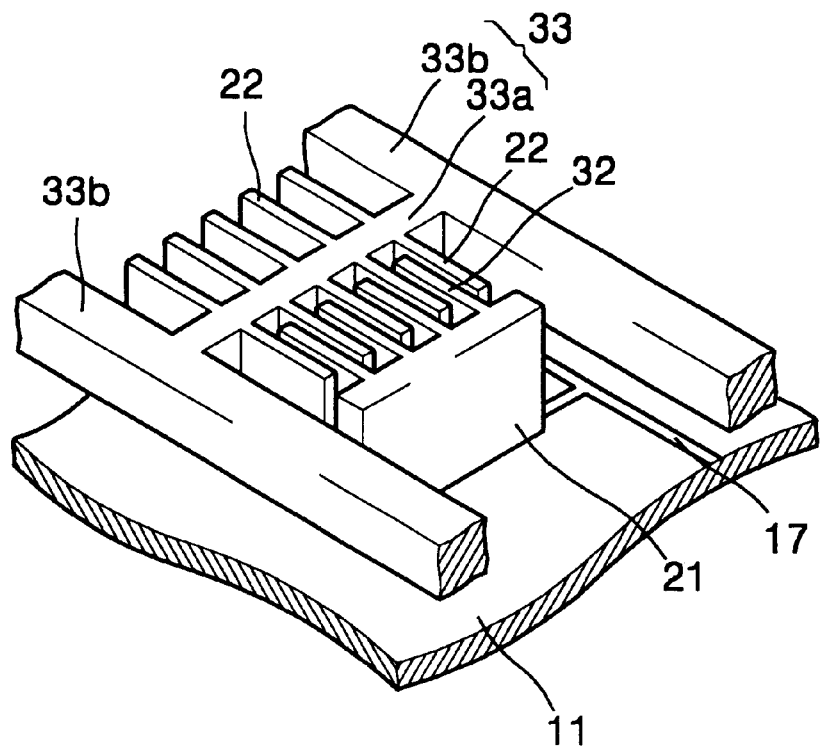
FIG. 2 is an extracted perspective view showing the structure of drive comb electrodes and fixed comb electrodes of the single stage microactuator with the multi-folded springs according to the present invention.

As shown in FIG. 2, each of the drive frame 33a has a plurality of drive comb electrodes 22 extending parallel to one another in a direction parallel to each side of the stage 41. Each of a plurality of fixed frames 21, which will be described later, has parallel fixed comb electrodes 32 interdigitated with the parallel drive comb electrodes 22 of each of the drive frames 33a. As shown in FIG. 1, a plurality of first spring parts 31 are located between each side of the stage 41 and each of the drive frame parts 33.

Figure 3:
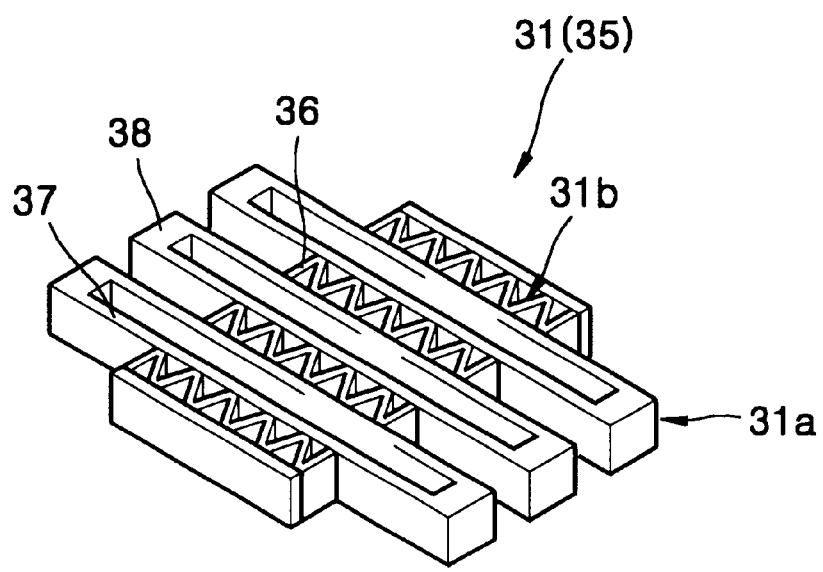
FIG. 3 is an extracted perspective view showing the structure of a spring portion of the single stage microactuator with the multi-folded springs according to the present invention.

Referring to FIG. 3, the first spring parts 31 include a plurality of spring members 31a, which are rectangular and parallel to one another, extending in a direction parallel to a side of the stage 41 and a plurality of spring holding members 31b interposed between each of the spring members 31a. Each of the spring holding members 31b is formed of a plurality of small connecting plates 36 arranged in a zigzag pattern at a predetermined angle with respect to the spring members 31a such that it has a stiffness strong enough to hold each of the spring members 31a. Each of the spring members 31a includes beam spring elements 37 corresponding to the longer sides of the spring members 31a, excluding a region contacting each of the spring holding members 31b, and beam spring connecting elements 38 corresponding to the shorter sides of the spring members 31a, each having a stiffness strong enough to connect and support the beam spring elements 37. Here, the length of the beam spring elements 37 and the number of spring members 31a are determined such that the first spring parts 31 can provide a relatively strong stiffness in an intended displacement direction of the stage 41 and in a direction perpendicular to the same. Second spring parts 35, which will be described later, have the same structure as the first spring parts 31.

Figure 4:
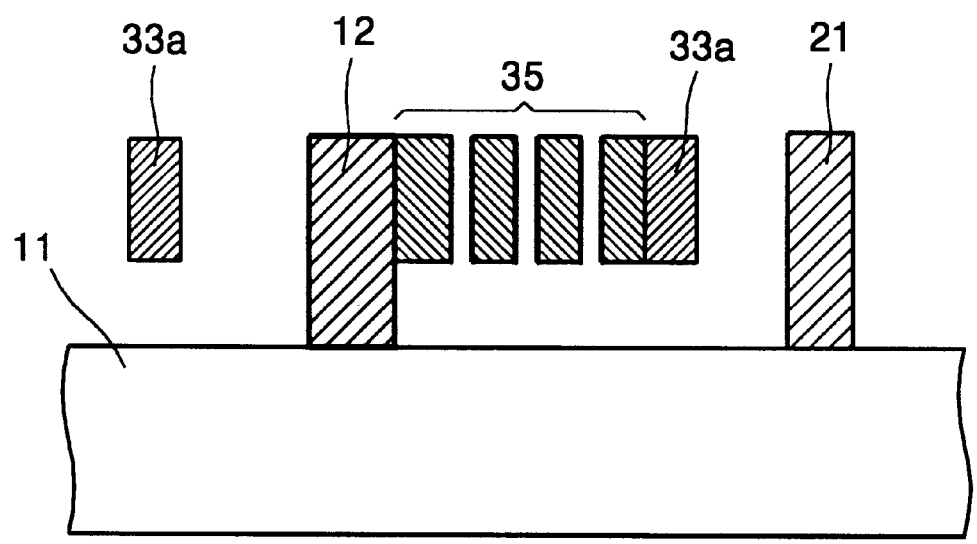
FIG. 4 is a sectional view taken along line A—A of FIG. 1.

FIG. 4 is a sectional view taken along line A—A of FIG. 1, showing the relation of the second spring parts 35 and the drive main frame parts 33. A plurality of fixed frames 21, which constitutes a fixed frame part for each side of the stage 41, are located in each of the drive frame parts 33. The fixed frames 21 are arranged alternately with and parallel to the drive frames 33a. Each of the fixed frames 21 is located in a rectangular unit frame region of the drive frame parts 33 having a lattice structure (see FIG. 2). The fixed frames 21 for each side of the stage 41 are electrically connected each other by a wire electrode 17 and connected to a fixed frame electrode pad 13 positioned at each corner of the substrate 11. The drive frame parts 33 are electrically connected to an external circuit (not shown) through the second spring parts 35 and a drive frame electrode pad 18 formed on the spring support 12.

Figure 5:
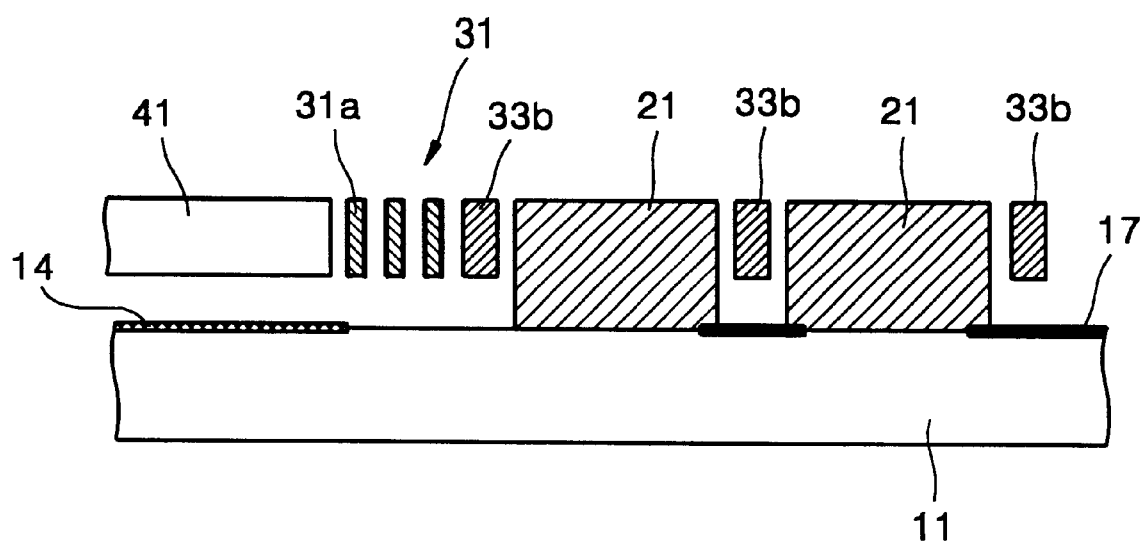
FIG. 5 is a sectional view taken along line B—B of FIG. 1.

FIG. 5 is a sectional view taken along line B—B of FIG. 1, showing the relation of the stage 41, the first spring parts 31, and the drive frame parts 33 adjacent to the first spring parts 31. The drive frame parts 33 for each side of the stage 41 is supported by a plurality of second spring parts 35. Each of the second spring parts 35, which supports the drive frame parts 33 with respect to the substrate 11 and urges the drive frame parts 33 in the direction of the drive comb electrodes 22 by its elastic bias, includes a plurality of spring members 31a extending in a direction parallel to the drive frames 33a of the drive frame part 33 and a plurality of spring holding members 31b for holding the spring members 31a. One side of each of the second spring parts 35 is connected to each of the drive frame parts 33 and the other side is connected to a spring support 12 attached to the substrate 11. A fixed plate electrode 14 is located below the stage 41 on the substrate 11 and is connected to a fixed plate electrode pad 16 positioned at one corner of the substrate 11 by a wire electrode 15.

Figure 6:
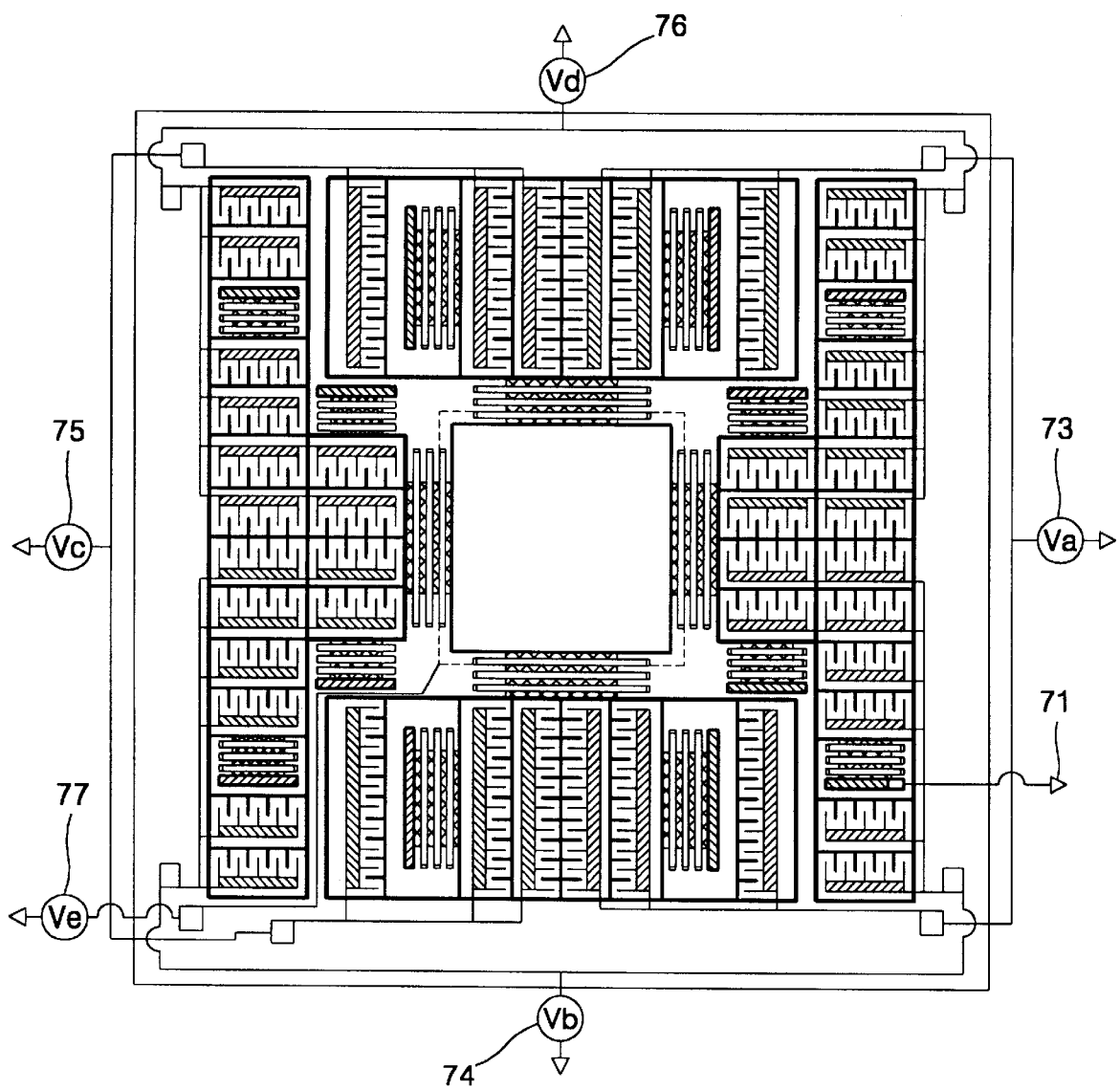
FIG. 6 shows arrangement of voltages applied to operate the single stage microactuctor with the multi-folded springs according to the present invention.

FIG. 6 shows arrangement of voltages applied to operate the multidimensional single-stage microactuator with the multi-folded springs according to the present invention. Reference numerals 73, 74, 75, and 76 represent voltages. The stage 41 moves in x- and y-directions on a plane by using electrostatic force produced due to a drop in voltage between the drive comb electrodes 22 and the fixed comb electrodes 32. Electrostatic force is exerted in four directions, i.e., to the right (positive x-direction) and left (negative x-direction) of the stage 41 and above (positive y-direction) and below (negative y-direction) the stage 41. The strength of the electrostatic force is varied by the difference in voltage between the fixed comb electrodes 32 and the drive frame electrodes 22, which are separately connected for each side of the stage 41, so that the amount of displacement of the stage 41 is controlled. The stage 41 may move in a direction perpendicular to the actuating plane due to gravity or an external load placed on the stage 41. To prevent vertical motion of the stage 41, an attraction force is applied between the fixed plate electrode 14 and the stage 41 by adjusting a voltage 77 applied to the fixed plate electrode 14.

Figure 7:
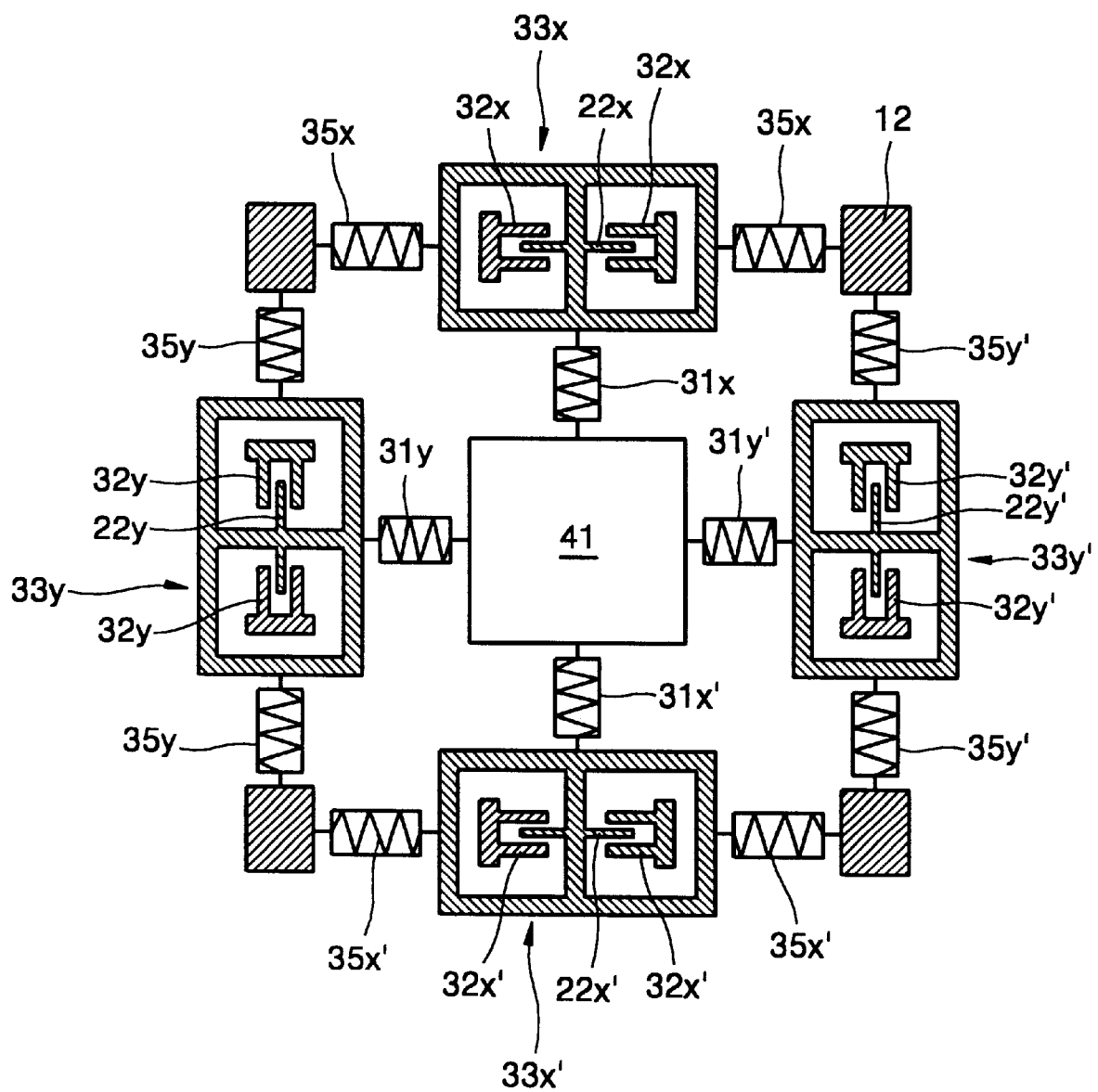
FIG. 7 shows a simplified view of the single stage microactuctor with the multi-folded springs according to the present invention, illustrating the principle of operation of the same.
Figure 8:
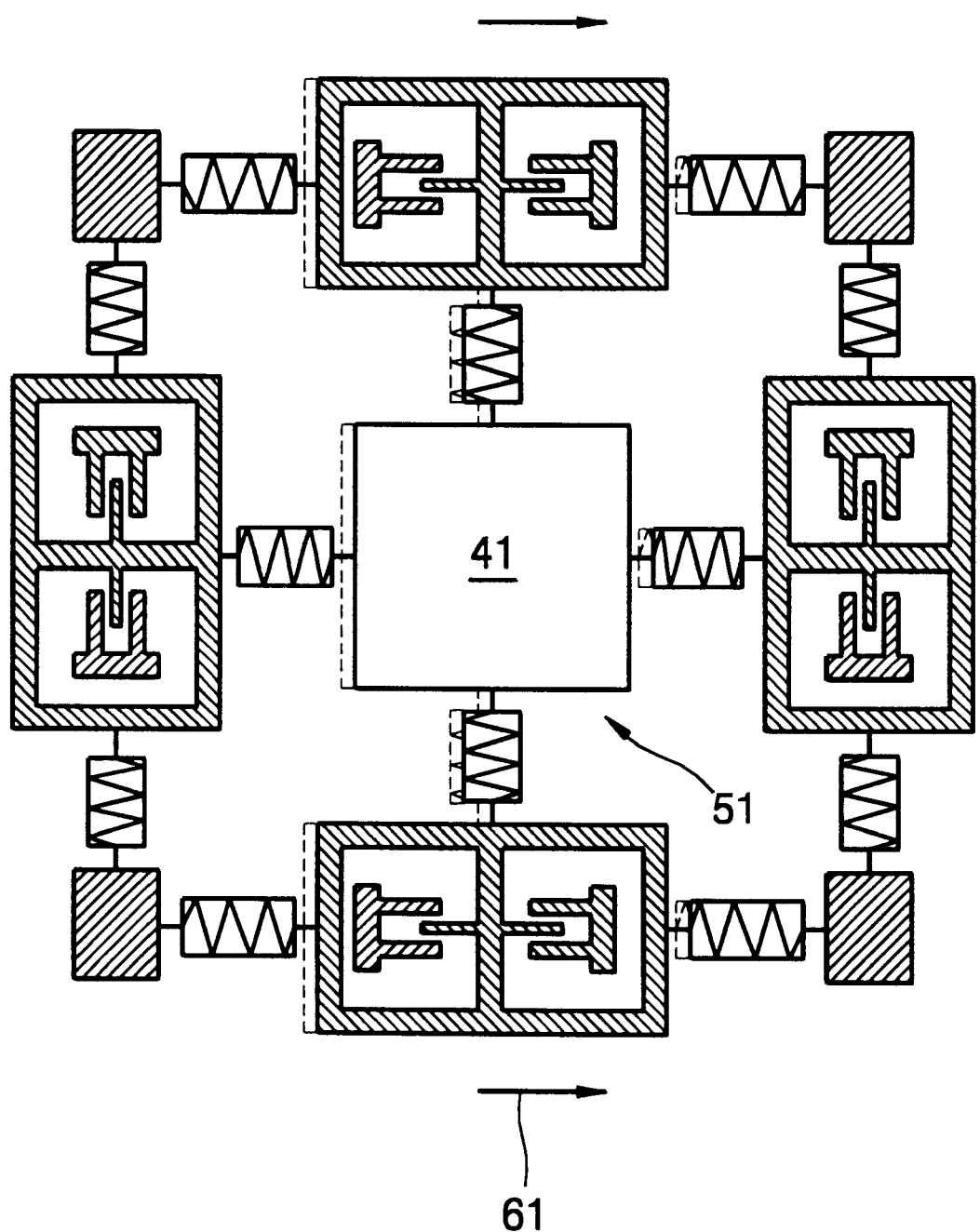
FIG. 8 is a simplified plan view of the single stage microactuator with the multi-folded springs according to the present invention, illustrating one-dimensional actuation.

A simplified model for illustrating the principle of actuating the single stage 41 having one electrode by the drive frame parts 33 is shown in FIG. 7. When intending to actuate the stage 41 in the positive x-direction, an electrostatic force 61 is produced by a drop in voltage between the drive comb electrodes 22x and 22x' and fixed bomb electrodes 32x and 32x', which are interdigitated in the drive frame parts 33x and 33x' aligned with the stage 41 in the y-direction. The stage 41 moves in the positive x-direction to a position 51, as shown in FIG. 8, as a result of the electrostatic force 61. At this time, the second spring parts 35x and 35x' connected to the drive frame parts 33x and 33x' is pulled and pressed to allow the drive frame portions 33x and 33x' to move in the actuating direction. As the first spring parts 31x and 31x' having one end connected to the drive frame parts 33x and 33x' move without being deformed in the positive x-direction along with the drive frame parts 33x and 33x', the stage 41 connected to other ends of the first spring parts 31x and 31x' moves in the actuating direction, i.e., positive x-direction. The first spring parts 31y and 31y' connected between the stage 41 and the drive frame parts 33y and 33y', which are actuated in they-direction, are pulled and pressed in the positive x-direction while being supported by the drive frame parts 33y and 33y'. For actuation in they-direction, the drive frame parts 33y and 33y' move according to the same principle as for actuation in the x-direction.

Figure 9:
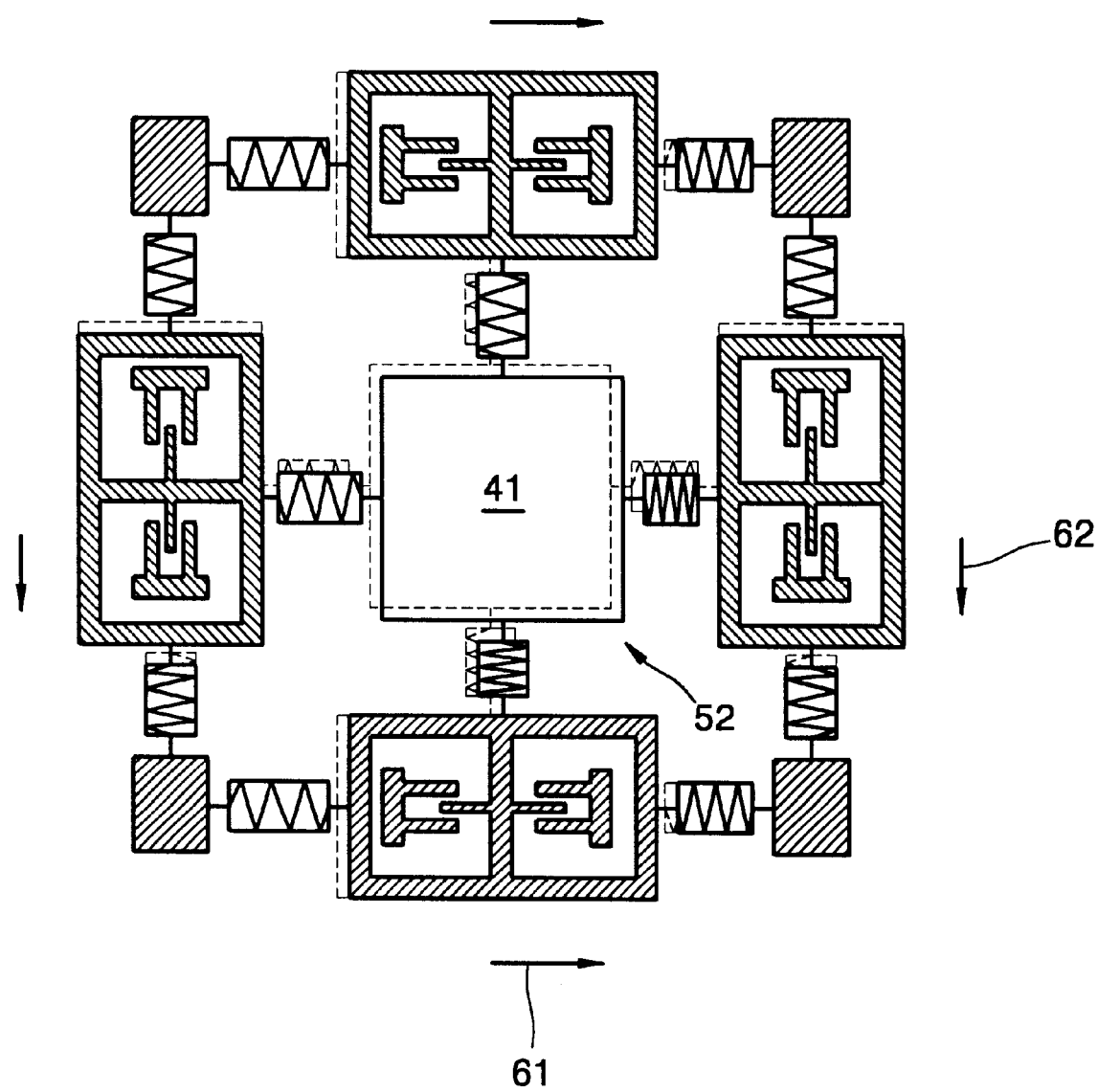
FIG. 9 is a simplified plan view of the single stage microactuator with the multi-folded springs according to the present invention, illustrating two-dimensional actuation.

When electrostatic forces 61 and 62 act in the positive x-direction and negative y-direction for biaxial actuation, the stage 41 is displaced to a position 52, as shown in FIG. 9. That is, actuation in both directions occurs concurrently. As the drive frame pants 33x, 33x', 33y, and 33y' are actuated in different directions, the first spring parts 31x, 31x', 31y, and 31y' act to move the stage 41 in the actuating directions of the drive frame parts 33x, 33x', 33y, and 33y' while being pressed or pulled to allow the stage 41 to be displaced in the actuating directions, which are perpendicular to each other. Due to the multi-folded structure of the springs, a coupling of motions in the actuating directions does not occur.

Figure 10:
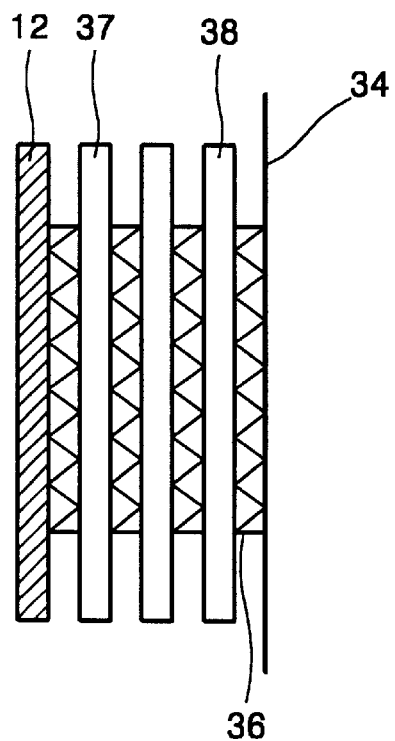
FIG. 10 shows the original shape of a multi-folded spring part of the single stage microactuator according to the present invention before being deformed.
Figure 11:
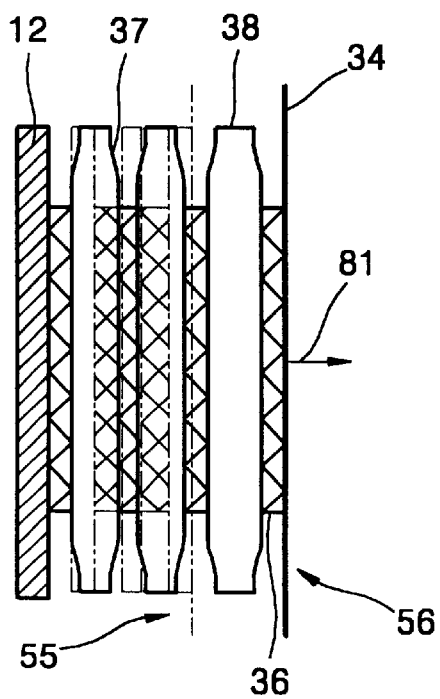
FIG. 11 shows a multi-folded spring part of the single stage microactuator according to the present invention being pulled by actuation in a direction.
Figure 12:
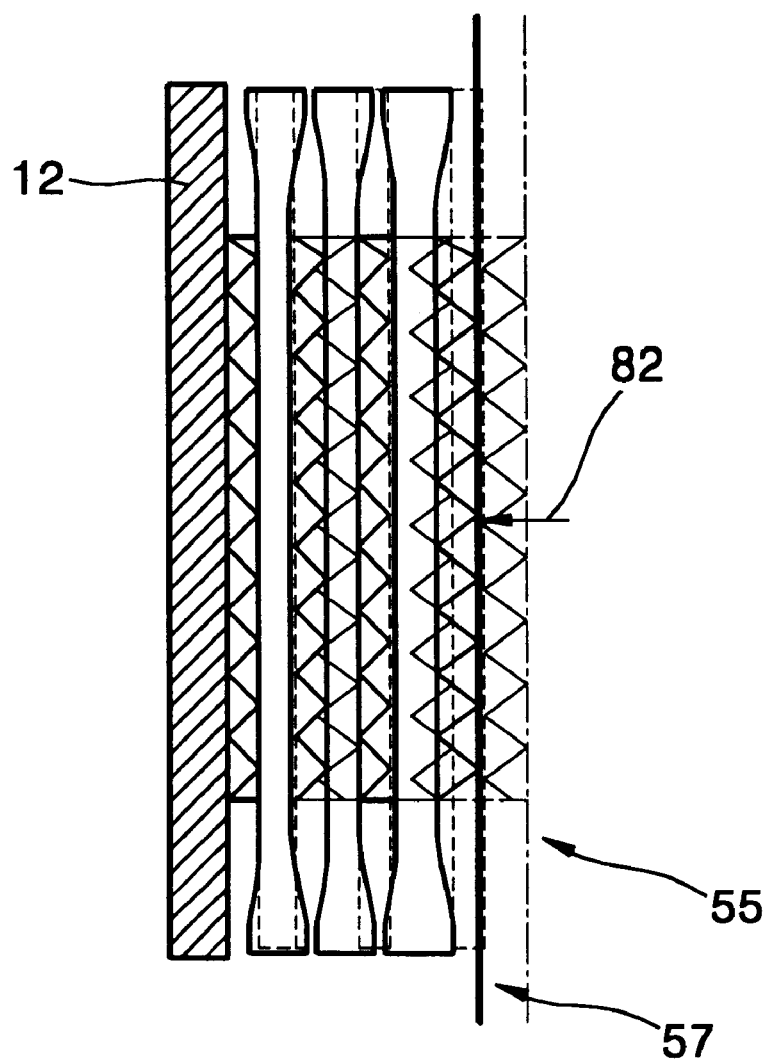
FIG. 12 shows a multi-folded spring part of the single stage microactuator according to the present invention being can be pressed by actuation in a direction.

FIG. 10 shows the original shape of one of the second spring parts 35 before deformation. FIGS. 11 and 12 show the second spring parts 35 being deformed when the drive frame parts 33 are actuated in directions 81 and 82, respectively. The same deformation occurs for the first spring parts 31. The second spring parts 35 are pulled in FIG. 11 and pressed in FIG. 12.

The microactuator according to the present invention can be used for a storage medium. The microactuator according to the present invention enables multidirectional actuation with only one electrode and can be manufactured by a simple process without the need for an insulation process.

Even when a stage for receiving a relatively large storage medium is mounted on the microactuator, motions other than x-y stage motion does not occur due to the multi-folded structure of support springs. In addition, coupling of motions in different directions does not occur due to the multi-folded structure of the support springs. Space utilization efficiency for the microactuator according to the present invention is increased by maximizing the area of the stage (storage area) with respect to the entire size of the microactuator.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A single stage microactuator for multidimensional actuation, comprising:

a substrate;

a fixed plate electrode formed at the center of the substrate;

a rectangular stage having first and second sides which are perpendicular to each other, the rectangular stage being located above the fixed plate electrode;

a plurality of drive frame parts arranged close to each of the first and second sides of the stage, each of the drive frame parts having a plurality of drive frames parallel to one another and perpendicular to the sides of the rectangular stage;

first spring parts each for connecting the first and second sides of the stages and the drive frame parts, each of the first spring parts having a plurality of spring members extending parallel to the first and second sides of the stage and a plurality of spring holding members for holding the spring members;

a plurality of fixed frame parts arranged on each of the first and second sides of the stage, each of the fixed frame parts having a plurality of parallel fixed frames alternately arranged with the drive frames of the drive frame parts;

drive comb electrodes extending parallel to one another and parallel to the first or second sides of the stage, from the drive frames of each of the drive frame parts;

fixed comb electrodes extending parallel to one another from the fixed frames of each of the fixed frame parts and being interdigitated with the drive comb electrodes; and second spring parts each for supporting the drive frame parts with respect to the substrate and urging the drive frame parts in the direction of the drive comb electrodes by its elastic bias, each of the second spring parts having a plurality of spring members extending parallel to the drive frames of the drive frame parts and a plurality of spring holding members for holding the spring members.

2. The single stage microactuator of claim 1, wherein the drive frames of each of the drive frame parts are connected by auxiliary drive frames at right angles to form a rectangular lattice structure.

3. The single stage microactuctor of claim 2, wherein the fixed frames of each of the fixed frame parts are fixed to the substrate and are separately and electrically connected for each of the fixed frame parts.

4. The single stage microactuator of claim 3, wherein ends of the spring members of the first and second spring parts are formed by spring connecting elements, and each of the spring holding members is located between neighboring spring members to connect the same and has a length shorter than the spring members, and one side of the second spring parts is connected to a spring support fixed to the substrate.

5. The single stage microactuator of claim 4, wherein each of the spring holding members of the first and second spring parts comprises a plurality of connecting plates arranged in a zigzag pattern at a predetermined angle with respect to the spring members to connect neighboring spring members.

6. The single stage microactuator of claim 3, wherein each of the spring holding members of the first and second spring parts comprises a plurality of connecting plates arranged in a zigzag pattern at a predetermined angle with respect to the spring members to connect neighboring spring members.

7. The single stage microactuator of claim 2, wherein each of the fixed frames of the fixed frame parts is located in one unit frame region formed by the drive frames and auxiliary drive frames, and the fixed frames are separately and electrically connected for each of the fixed frame parts.

8. The single stage microactuator of claim 7, wherein ends of the spring members of the first and second spring parts are formed by spring connecting elements, and each of the spring holding members is located between neighboring spring members to connect the same and has a length shorter than the spring members, and one side of the second spring parts is connected to a spring support fixed to the substrate.

9. The single stage microactuator of claim 8, wherein each of the spring holding members of the first and second spring parts comprises a plurality of connecting plates arranged in a zigzag pattern at a predetermined angle with respect to the spring members to connect neighboring spring members.

10. The single stage microactuator of claim 7, wherein each of the spring holding members of the first and second spring parts comprises a plurality of connecting plates arranged in a zigzag pattern at a predetermined angle with respect to the spring members to connect neighboring spring members.

11. The single stage microactuator of claim 2, wherein ends of the spring members of the first and second spring parts are formed by spring connecting elements, and each of the spring holding members is located between neighboring spring members to connect the same and has a length shorter than the spring members, and one side of the second spring parts is connected to a spring support fixed to the substrate.

12. The single stage microactuator of claim 11, wherein each of the spring holding members of the first and second spring parts comprises a plurality of connecting plates arranged in a zigzag pattern at a predetermined angle with respect to the spring members to connect neighboring spring members.

13. The single stage microactuator of claim 2, wherein each of the spring holding members of the first and second spring parts comprises a plurality of connecting plates arranged in a zigzag pattern at a predetermined angle with respect to the spring members to connect neighboring spring members.

14. The single stage microactuator of claim 1, wherein the fixed frames of each of the fixed frame parts are fixed to the substrate and are separately and electrically connected for each of the fixed frame parts.

15. The single stage microactuator of claim 14, wherein ends of the spring members of the first and second spring parts are formed by spring connecting elements, and each of the spring holding members is located between neighboring spring members to connect the same and has a length shorter than the spring members, and one side of the second spring parts is connected to a spring support fixed to the substrate.

16. The single stage microactuator of claim 15, wherein each of the spring holding members of the first and second spring parts comprises a plurality of connecting plates arranged in a zigzag pattern at a predetermined angle with respect to the spring members to connect neighboring spring members.

17. The single stage microactuator of claim 14, wherein each of the spring holding members of the first and second spring parts comprises a plurality of connecting plates arranged in a zigzag pattern at a predetermined angle with respect to the spring members to connect neighboring spring members.

18. The single stage microactuator of claim 1, wherein ends of the spring members of the first and second spring parts are formed by spring connecting elements, and each of the spring holding members is located between neighboring spring members to connect the same and has a length shorter than the spring members, and one side of the second spring parts is connected to a spring support fixed to the substrate.

19. The single stage microactuator of claim 18, wherein each of the spring holding members of the first and second spring parts comprises a plurality of connecting plates arranged in a zigzag pattern at a predetermined angle with respect to the spring members to connect neighboring spring members.

20. The single stage microactuator of claim 1, wherein each of the spring holding members of the first and second spring parts comprises a plurality of connecting plates arranged in a zigzag pattern at a predetermined angle with respect to the spring members to connect neighboring spring members.

* * * * *